(12) United States Patent
Manning

(10) Patent No.: US 6,473,400 B1
(45) Date of Patent: Oct. 29, 2002

(54) COMPUTATION OF TRAFFIC FLOW BY SCALING SAMPLE PACKET DATA

(75) Inventor: G Keith Manning, Linlithgow (GB)

(73) Assignee: 3Com Technologies, Gerogetown, KY (US)

( * ) Notice: Subject to any disclaimer, the term of this patent is extended or adjusted under 35 U.S.C. 154(b) by 0 days.

(21) Appl. No.: 09/286,473

(22) Filed: Apr. 6, 1999

(30) Foreign Application Priority Data

May 15, 1998 (GB) ................................ 9810376

(51) Int. Cl.$^7$ ................................ H04L 12/26
(52) U.S. Cl. .................. 370/229; 370/231; 370/232; 370/252; 370/253
(58) Field of Search ................ 370/229, 230.1, 370/231, 232, 233, 234, 235, 252, 253; 709/224

(56) References Cited

U.S. PATENT DOCUMENTS 5,634,009 A * 5/1997 Iddon et al. ............ 395/200.11
5,886,643 A * 3/1999 Diebboll et al. ........ 340/825.08
6,278,694 B1 * 8/2001 Wolf et al. .................. 370/253

FOREIGN PATENT DOCUMENTS

| EP | 0542406 A1 | 5/1993 | |
|----|------------|--------|---|
| GB | 0 477 448 A1 * | 4/1992 | H04L/12/26 |
| GB | 0 542 406 A1 * | 5/1993 | H04L/12/26 |
| WO | WO 96/38955 | 12/1996 | |
| WO | WO 98/11702 | 3/1998 | |
| WO | WO 98/26541 | 6/1998 | |

* cited by examiner

*Primary Examiner*—Alpus H. Hsu
*Assistant Examiner*—Thien D Tran
(74) *Attorney, Agent, or Firm*—Nixon & Vanderhye P.C.

(57) ABSTRACT

A method of computing statistics relating to the flow of data by way of a packet-switched data transmission system wherein a packet includes path address data and network address data, and the network includes means, such as an RMON1 matrix table, for providing traffic flow data indexed according to each of a plurality of traffic flow paths identified by the path address data. Data packets are sampled and, for each of a multiplicity of packet types indexed according to selected address data within the packets, traffic flow counts are respectively incremented in response to each new sample data packet of the respective type. For each traffic flow path indicated in sample packets a respective one of a plurality of reference traffic flow counts is incremented in response to each new relevant sample data packet. Values corresponding to said traffic flow data are stored for each of the traffic flow paths for which said reference traffic flow counts are accumulated. An indication of the traffic flow for a packet type is obtained by scaling the respective accumulated count in accordance with the ratio between a count from the traffic flow data for the traffic flow path relevant to the packet type count and the respective reference count. The traffic counts may be in terms of numbers of packets or numbers of octets or both.

4 Claims, 3 Drawing Sheets

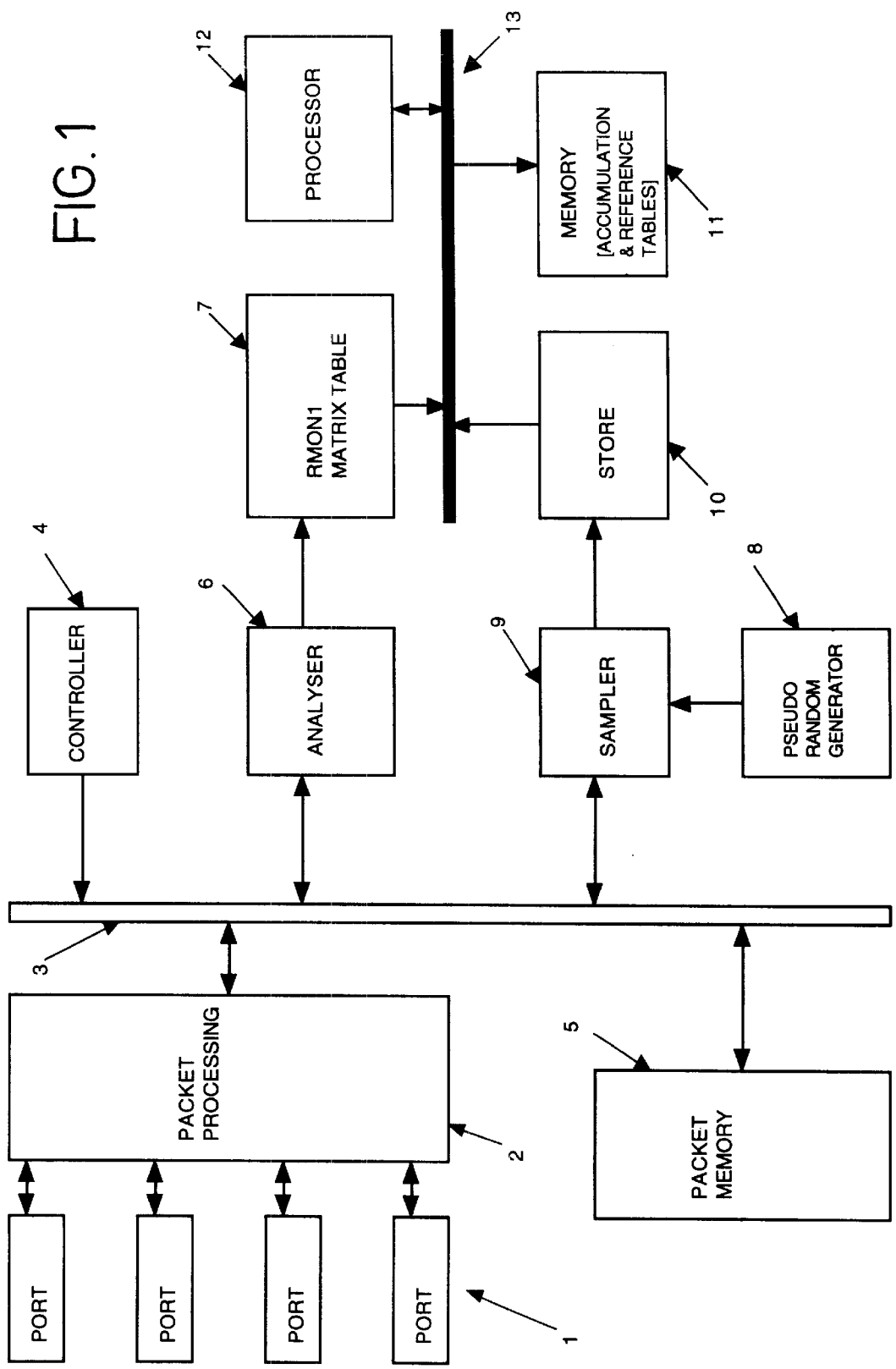

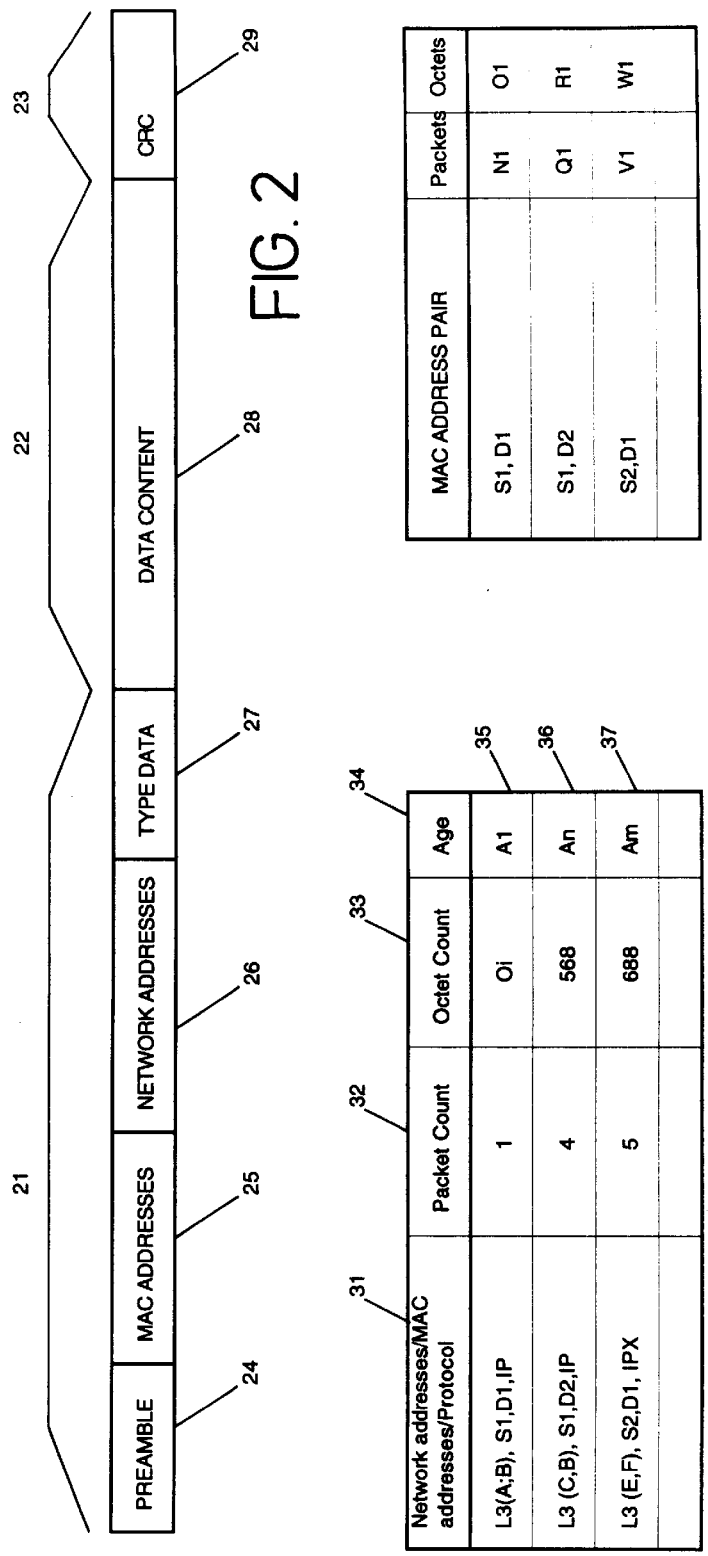

| MAC ADDRESS PAIR | Packets | Octets |
|---|---|---|
| S1, D1 | N2 | O2 |
| S1, D2 | Q2 | R2 |
| S2, D1 | V2 | W2 |

RMON MATRIX TABLE 7

| Network addresses/MAC addresses/Protocol | Packet Count | Octet Count | Age |
|---|---|---|---|
| L3(A;B), S1,D1,IP | Na | Qa | A1 |
| L3 (C,B), S1,D2,IP | 4 | 568 | An |
| L3 (E,F), S2,D1, IPX | 5 | 688 | An |

ACCUMULATION TABLE 30

| MAC address pair | Initial Pkts | Initial Octs | Pr | Or |
|---|---|---|---|---|
| S1,D1 | N1 | O1 | Nr | Or |

REFERENCE TABLE 40

FIG. 4

COMPUTATION OF TRAFFIC FLOW BY SCALING SAMPLE PACKET DATA

FIELD OF THE INVENTION

The present invention generally relates to packet-switched data networks, such as ethernet networks wherein information is transferred, for example, between terminals connected to nodes in the network by means of packets which comply with agreed transmission formats and contain, in addition to information provided by or received by the users who are connected to the network, address and control information.

GENERAL BACKGROUND

Typically, a data packet of the kind which can be monitored in accordance with the present invention includes address data which relates to signal flow paths in the network and other address data (called herein network address data) which relates to users connected to the network. Examples of the former are media access control (MAC) addresses and examples of the latter are network addresses of data sources and destinations and protocol address data such as IP (Internet protocol). Normally a packet will contain a header which includes both types of address data. It will be understood that in the usual operation of a large scale network, the address data which relates to signal paths (called hereinafter path address data) may be common to a multiplicity of network addresses.

Various transmission conventions prescribe a particular layering of the network devices and the data which control them. The path address data (and specifically the media access control addresses) are by convention termed Layer 2 (L2) and the network address data previously mentioned are conventionally termed Layer 3 (L3) addresses, in particular conforming to the IEEE.802 formats.

BACKGROUND TO THE INVENTION

It is known practice to monitor traffic flow in network segments or paths identified or indexed according to the path data addresses (MAC addresses) of packets traversing the network. It is theoretically possible to compute traffic flows indexed according to selected data identifying network segments, or relevant users or packet types by monitoring all the packets. However, such monitoring requires very substantial data processing. Where, as is frequent, processing resources are limited, as in for example network switches and other networking devices, instead of gathering statistics on all the network traffic, packets can be sampled, typically randomly, pseudo randomly or periodically, and the sampled data may be scaled appropriately to estimate the actual network traffic based on the characteristics of the samples so as to derive figures for network traffic indexed according to selected packet types, identified by source, destination, protocol or other selected criteria.

The measurement of traffic flow may be in terms of the number of packets or the information content, usually the the total number of octets, or both. Where a measure of both the octet count and the packet count is required, scaling factors may typically be calculated by estimating a mean packet rate or octet rate for an interval over which samples have been acquired and using the mean rate to scale the sampled data.

Scaling data using a mean packet rate or octet rate is generally known. It has been implemented for what are known conventionally as RMON1 statistics. For the present purposes, RMON1 statistics are intended to include traffic flow data indexed according to data flow paths, i.e. MAC or L2 addresses.

It is possible to derive RMON2 data, for example measures of traffic flow related to source and destination terminals or L3 addresses rather than network nodes or segments, by means of scaling from mean rates. However, the object of the present invention is to improve the collection of RMON2 statistics by using actual measures of traffic flow.

In particular, the present invention is based on the use of actual traffic flow data related to data path addresses, and particularly RMON1 data, to perform the scaling of sampled data relating to network addresses, and particularly RMON2 data.

SUMMARY OF THE INVENTION

Broadly, the present invention concerns a method of computing statistics relating to the flow of data by way of a packet-based data transmission system wherein a packet includes path address data (as herein defined) and network address data (as herein defined) and wherein the network includes means for providing traffic flow data indexed according to each of a plurality of traffic flow paths identified by the path address data. In a specific example, the said means for providing such traffic flow data may be constituted by a RMON1 matrix table.

A first feature of the invention is the sampling of data packets and the accumulation, for each of a multiplicity of packet types indexed according to selected network address data within the packets, traffic flow counts which are respectively incremented in response to each new sample data packet of the respective type.

Although in some circumstances it may be necessary to read all of a packet when sampling, it is generally preferable to read only part, and particularly a header portion containing address data.

Another feature of the invention is the accumulation, for each traffic flow path indicated in sample packets, a respective one of a plurality of reference traffic flow counts, the reference traffic flow counts being incremented in response to each new sample data packet relevant to the respective traffic flow path.

Another feature of the invention concerns storing values corresponding to said traffic flow data for each of the traffic flow paths for which said reference traffic flow counts are accumulated.

A further feature of the invention concerns obtaining an indication of the traffic flow for a packet type by scaling the respective accumulated count in accordance with the ratio between a count from the traffic flow data for the traffic flow path relevant to the packet type count and the respective reference count.

The invention is further described with reference to the accompanying drawings.

BRIEF DESCRIPTION OF THE DRAWINGS

FIG. 1 is a schematic representation of a network switch including the monitoring of packets.

FIG. 2 is a simplified representation of a packet.

FIG. 3 is an illustration of various tables which are established in a preferred technique according to the invention.

FIG. 4 is an illustration of the tables of FIG. 3 shown at a later time.

DETAILED DESCRIPTION

As mentioned hitherto, the present invention is intended for use in conjunction with a packet-based data transmission network which includes a network switch or other network device that is capable of providing RMON1 statistics and in particular traffic flow data representing the actual traffic flow in a plurality of traffic flow paths identified by the respective MAC source and destination addresses. In its usual form such traffic flow data is representable by a RMON1 matrix table.

The accompanying FIG. 1 illustrates in schematic form a typical network switch in which the invention may be practised. The general form of the switch is not important to the present invention provided that, as will be apparent, the switch has some suitable means for monitoring traffic flow according to "layer 2" conversations and means for sampling packets to provide sampled traffic flow data based on a combination of layer 2 and layer 3 addresses. It is already been remarked that although it is theoretically possible to obtain measures of traffic flow by monitoring all packets and establishing data tables according to every address combination (using both layer 2 and layer 3 addresses), such a process would require excessive computational effort and storage capacity.

FIG. 1 illustrates in simplified form a network switch having a plurality of ports 1 which are connected by way of processing functions 2, which may typically comprises a plurality of well known functions. In addition to any elastic buffering that may be required, the functions may include performing look ups on address data to determine the port or ports from which a given packet should be sent and performing any necessary encapsulation or processing on the packets. The packets are stored by way of a bus 3 under the control of an access controller 4 in a packet memory 5. Typically the packet memory holds queues of packets prior to their transmission from the ports for which they are destined. A variety of different configurations of switch are possible and the foregoing is only given by way of background information.

Typically, as is known, all packets traversing the switch may be examined on the basis of their layer 2 addresses by means of a RMON 1 analyser 6 so as to establish in memory an RMON 1 matrix table 7 which will be further explained hereinafter.

It is also known to sample data packets randomly, pseudo randomly or periodically by means of a sampler which is controlled by some sampling generator to sample at least the header portions of a packet on a data bus within a switch and to store the results. This is known in itself from, for example, WO96/38955 as well as EP-A-0477448 and EP-A-0542406.

In FIG. 1, the sampling of packets may proceed, with the differences noted below, in a manner similar to that described in WO96/138955, in that a sampler 9 is controlled by a pseudo random generator 8 to sample address data and to store the sampled address data in a store 10.

In order to implement a technique according to the invention, some further processing facility is required to examine the data stored in store 10, to access information available from the RMON 1 matrix table 7 and to develop in memory certain tables which will be described with reference to FIG. 3. This additional facility is shown in FIG. 1 as a processor 12 coupled to store 10 and RMON 1 matrix 7 and to memory space 11 by way of a bus 13.

By way of background it is convenient to review the general form of a packet which may be analysed according to the invention. The invention is applicable to a variety of different types of packet and thus FIG. 2 is given only by way of example. In a typical packet as shown in simplified form in FIG. 2, the packet 20 comprises a header 21, a data portion 22 and a checksum 23. The data portion 22 contains the information conveyed by the packet and the checksum portion 23 normally consists of cyclic redundancy code data. The header 21 may undergo a variety of changes as it progresses from a source to a destination. The header typically comprises a preamble 24, layer 2 address data (MAC addresses) 25, layer 3 (network) address data 26 and type data 27. Of these, the layer 2 or media access control address data normally consists of data identifying the network device from which the packet has been sent to the switch and the network device to which the packet should be sent whereas the network address data indicates the source and destination of the packet in network terms (i.e. not the physical route between source and destination which the packet is to follow) and other address data such as protocol address data (IP, IPX, IP.UDP and so on). The type data 27 is generally used to distinguish between, for example, packets sent by a network management entity and packets sent from one user or client of the network to another. However, in the present invention the term 'packet type' refers to a classification based on address data.

One feature of the invention, as indicated above, concerns the sampling of data packets. Consider a time interval over which packet samples have been collected, the collection being random, pseudo random or periodic. The packet samples may be decoded to provide, in this example, the following network conversation information (i) L2 addresses, i.e. MAC source and destination addresses; and (ii) L3 addresses, i.e. source and destination addresses of users and protocol addresses such as IP, IPX, IP.UDB, port numbers and such like. The decoding also provides a representation of the number of octets in each sample.

Once the sample packet or part of a packet is decoded, a per-conversation, cumulative history table 30 referred to hereinafter as the "accumulation queue" established in the memory 11 is searched for previously encountered sample packets which have fields identical to the selected data fields. In the particular example given, there will be a 'column' 31 in the table for each type of packet identified by a unique combination of MAC source and destination addresses, the (user) source and destination addresses and the protocol, with a 'column' 32 for packet count, a 'column' 33 for octet count and a 'column' 34 for the age of the entry.

If there is already an entry in the table precisely corresponding to the selected data fields of the packet, the octet count in the table entry is increased by the octet count of the newly sampled packet and a packet count field associated with this conversation is incremented.

If there is no identical entry in the cumulative history table, a new entry must be created in the table with a packet count set to 1 and a creation time field set to the current system time. The table illustrated chairs a new entry 35, which has network addresses A and B, MAC addresses S1 and D1 and protocol IP. Two existing entries with arbitrary packet and octet counts are shown at 36 and 37. Each entry in table 30 defines a packet type indexed according to selected address data.

When a new entry is created in the accumulation queue, a new entry in also created in an associated table 40, hereinafter called the "reference table". This contains data indexed according to the L2 source and destination addresses of the newly sampled packet and each entry defines a traffic flow path. Entries in this table are preferably initialised with the packet count (N1) and octet count (O1) derived by reading from the RMON matrix table 7 the values for the 'conversation' identified by this particular pair of L2 addresses (in this case S1, D1). The RMON 1 matrix table will hold a packet count and a octet count for each L2 MAC address conversation that has taken place since monitoring began. Two other arbitrary examples, for address pairs S1, D2 and S2, D1 are shown in the table 7.

Additional fields in the reference table contains the current number of packets (Pr) present in the accumulation queue entries that have the same corresponding L2 conversation addresses and the respective accumulative octet counts (Or). For a new entry as shown at 41, Pr is equal to unity and Or is equal to the first sample's octet count. Thus, for example, if the entry 36 in table 30 had the MAC address pair (S1, D1) the values of Pr and Or in entry 41 of table 40 would be 5 and (Oi+568), being the sums of the relevant packet counts and octet counts.

The octet and packet counts in the reference table 40 are updated accordingly as further samples are taken which have corresponding L2 addresses. Thus for a second sample which has the same MAC address pair as the first new sample, the relevant entry (Pr) in the reference table will contain a packet count of 2, and an octet count (Or) which is the sum of the octet counts for the first two respective samples having the respective pair of MAC addresses and will also contain the initial packet count and octet count for that MAC address pair obtained from the RMON1 traffic flow data.

It should be clear that the reference table has traffic flow counts which are indexed or classified according to a MAC address pair, this indexing corresponding to the indexing of the actual traffic flow data in the RMON1 matrix, whereas the accumulation queue is indexed according to the entire selected address data, typically not only the MAC source and the destination addresses, but also the respective L3 data, i.e the network address data (or a selection therefrom).

Further samples may be acquired and the tables updated until some fixed time interval has elapsed. At the end of this interval the accumulation queue entries are preferably scanned to determine whether any of the entries have "expired". An entry in the accumulation queue is deemed to have 'expired' if its creation time (shown in column 34) differs from the current system time by more than a predetermined number of system time intervals. Using this technique, accumulation entries are destined to exist in the accumulation queue only for a fixed duration no matter when they are created.

If an entry in the accumulation table has 'expired' it is transferred to a separate buffer area of scaling. The scaled data can be used to build a set of RMON2 statistics in conventional form but may be transferred directly to an 'application' (a user's programme) so that the traffic data may be presented in a meaningful manner to a user.

The expired data may be scaled as follows. First, the particular L2 addresses in an expired accumulation entry are used to index the RMON1 matrix data to find the actual number of packets and octets which have been monitored on the network for the respective pair of MAC addresses. For the (S1, D1) pair these are N2 and O2 respectively. The total number of packets (N) and octets (O) corresponding to this pair of MAC addresses which have occurred in the relevant interval is the difference between the RMON1 counts at the beginning and end of the interval. These values can be extracted from the corresponding entries in the tables 40 and 7. Thus:

$$N=N2-N1 \text{ packets}$$

and $$O=O2-O1 \text{ octets.}$$

The MAC address pair for the expired packets may then be used to index the reference table to determine how many of the actual sample packets (Nr) and octets (Or) have been accumulated for the MAC address pair corresponding to the expired packet. The expired accumulation queue packet count (Na) and octet count (Oa) may then be scaled using the ratio of the actual traffic flow data and the reference sample counts. Thus:

$$Ps=Na.N/Nr \text{ packets;}$$

and $$Os=Oa.O/Or \text{ octets.}$$

After all the expired entries have been scaled, a final pass of both the accumulation queue and reference table would be required to delete all the expired entries from the accumulation queue and to remove their contributions to the packet and octet counts currently held in the reference table. If any of the packet counts or octet counts in the reference entries become zero during this process the entry may be considered to be deleted from the table and the memory occupied may be re-used for further new sampled L2 conversations.

Using this technique the computed estimates for packet count and octet count should now agree closely with that measured by the RMON matrix table and thus be more accurate than techniques using estimated mean rates.

The protocol distribution and other RMON2 statistics for any given L2 conversation may be estimated from properties of the sampled packets.

In order to save memory space, the tables may store hashed addresses rather than the full addresses, the hashed address data pointing to the full address in a separate memory in known manner. The term 'address data' is accordingly intended to include hashed addresses as well as truncated addresses.

What is claimed is:

1. A method of computing statistics relating to the flow of data by way of a packet-switched data transmission system wherein a packet includes path address data and network address data and wherein the network includes means for providing traffic flow data indexed according to each of a plurality of traffic flow paths identified by the path address data, the method comprising:

(i) sampling data packets;

(ii) accumulating, for each of a multiplicity of packet types indexed according to selected address data within the packets, traffic flow counts which are respectively incremented in response to each new sample data packet of the respective type;

(iii) accumulating, for each traffic flow path indicated in sample packets, a respective one of a plurality of reference traffic flow counts, the reference traffic flow counts being incremented in response to each new sample data packet relevant to the respective traffic flow path;

(iv) storing values corresponding to said traffic flow data for each of the traffic flow paths for which said reference traffic flow counts are accumulated; and (v) obtaining an indication of the traffic flow for a packet type by scaling the respective accumulated count in accordance with the ratio between a count from the traffic flow data for the traffic flow path relevant to the packet type count and the respective reference count.

2. A method according to claim 1 wherein the selected address data includes network address data and path address data.

3. A method according to claim 1 wherein the means for providing traffic flow data indexed according to traffic flow path comprises an RMON1 matrix table.

4. A method according to claim 1 wherein the traffic flow counts indexed according to selected data are in the form of an accumulation queue wherein the first data packet sample for a new entry is created along with a creation time and from time to time this table is cleared to provide the accumulated counts.

* * * * *